United States Patent [19]
Mayrargue

[11] Patent Number: 5,990,832
[45] Date of Patent: Nov. 23, 1999

[54] ANTENNA ARRAY FOR BASE STATION FOR RADIOCOMMUNICATION WITH MOBILES

[75] Inventor: Sylvie Mayrargue, Paris, France

[73] Assignee: France Telecom, Paris, France

[21] Appl. No.: 09/124,175

[22] Filed: Jul. 28, 1998

[30] Foreign Application Priority Data

Jul. 28, 1997 [FR] France ................................ 97 09572

[51] Int. Cl.⁶ ................................ G01S 3/16; G01S 3/28
[52] U.S. Cl. ...................... 342/380; 342/382; 342/383; 342/368
[58] Field of Search ................................ 342/380, 382, 342/383, 450, 367, 368

[56] References Cited

U.S. PATENT DOCUMENTS

| | | | |
|---|---|---|---|
| 4,010,469 | 3/1977 | Marcum | 343/18 E |
| 5,260,707 | 11/1993 | Goldman | 342/16 |
| 5,359,329 | 10/1994 | Lewis et al. | 342/17 |
| 5,422,637 | 6/1995 | Sezai | 342/13 |
| 5,614,914 | 3/1997 | Bolgiano et al. | 342/364 |
| 5,646,942 | 7/1997 | Oliver et al. | 370/112 |
| 5,828,658 | 10/1998 | Ottersten et al. | 370/310 |

FOREIGN PATENT DOCUMENTS

| | | | |
|---|---|---|---|
| 676331B | 1/1995 | Australia . | |
| 6841494 | 2/1995 | Australia . | |
| 2 716 761 | 9/1995 | France | H04B 7/204 |
| 2 755 565 | 5/1998 | France | F16F 13/14 |
| 43 22 863 | 1/1995 | Germany | H04B 7/26 |
| WO 97/08849 | 3/1997 | WIPO | H04B 7/04 |

OTHER PUBLICATIONS

French Preliminary Search Report dated Apr. 3, 1998, French Application FR 9709572.

Mizuno et al., "Application of Adapative Array Antennas to Radio Communications," *Electronics and Communications in Japan*, Part 1, vol. 77, pp. 48–58 (Feb. 1994).

Horneffer et al., "Directed Antennas in the Mobile Broadband System," *Proceedings of IEEE Infocom 1996*, pp. 704–712 (Mar. 1996).

Anderson et al., "An Adaptive Array for Mobile Communication Systems," *IEEE Transactions on Vehicular Technology*, vol. 40, No. 1, pp. 230–236 (Feb. 1991).

Lee, Mobile Communications Design Fundamental, First Edition, pp. 113–122 (1986).

U.S. application No. 08/965,.501, filed.

*Primary Examiner*—Thomas H. Tarcza
*Assistant Examiner*—Dao L. Phan
*Attorney, Agent, or Firm*—Marshall, O'Toole, Gerstein, Murray & Borun

[57] ABSTRACT

This antenna array for base station for radiocommunication with mobiles comprises N first sensors, N being an integer greater than 2, arranged in such a way that the array exhibits substantially no ambiguity; an $(N+1)^{th}$ sensor placed or contrived in such a way as to receive signals which are decorrelated from the previous ones; and a module for processing the signals received, making it possible to locate, in an explicit or implicit manner, a transmitting mobile from the signals received by the N sensors alone, and to combine these signals and the signals received by the $(N+1)^{th}$ sensor so as to improve reception by effecting spatial or spatio-temporal diversity.

9 Claims, 2 Drawing Sheets

ANTENNA ARRAY FOR BASE STATION FOR RADIOCOMMUNICATION WITH MOBILES

FIELD OF THE INVENTION

The present invention relates to antenna arrays intended for base stations for radiocommunication with mobiles. It finds a particularly important application in cellular radiotelephony systems.

The term "antenna array" denotes the assembly consisting of antennas proper, that is to say radio signal sensors, and processing means which are associated therewith and make it possible in particular to deliver a final reception signal from the signals received from a mobile, via paths which may be multiple.

BACKGROUND OF THE INVENTION

Antenna arrays are already known which are intended for concentrating the energy received from a mobile via multiple paths. To do this, it is preferable for the sensors to be mutually decorrelated. This decorrelation can be obtained by various processes. For example, the antennas can be designed to receive signals having different polarizations. The most frequent solution consists however in using antennas which are spaced sufficiently far apart. If the multiple paths are distributed in a substantially omnidirectional manner around the antenna array, a spacing of the sensors of the order of half the wavelength is sufficient to ensure decorrelation. However, the directions of arrival of the various multiple paths are generally distributed within a cone of relatively small aperture. Signal decorrelation therefore requires that the mutual spacing of the sensors be made so as greatly to exceed half the wavelength and so as in general to be greater than one wavelength.

The antenna array must also make it possible, by processing the signals received from a mobile, to locate it directionally so as subsequently to allow transmission to the mobile with concentration of energy towards the latter. The location processing mentioned above can be "explicit" and implement, for example, a process of the type described in the article by ANDERSON S., MILLNERT M., VIBERG M., WAHLBERG B., "An adaptive array for mobile communication systems", IEEE Transactions on Vehicular Technology, Vol. 40, No. 1, February 1991, pages 230–236. The location processing can also be "implicit" and implement, for example, a process of the type described in French Patent Application No. 96 13597.

The antenna arrays used at the present time do not make it possible simultaneously to carry out the two functions of location and diversity of reception, making it possible to improve reception, by virtue of the processing of mutually decorrelated signals.

This is because, at present, the same antenna array is generally used both for reception and transmission. Satisfactory location processing is possible only if the array is devoid of ambiguity, that is to say of side lobes whose amplitude is comparable to the amplitude of the main lobe. For more details regarding the concept of array ambiguity, useful reference may be made to the Thesis by A. FLIELLER, "Mise en oeuvre des méthodes à haute résolution en traitement d'antenne: autocalibration robuste et géométrie des réseaux" [Implementation of high-resolution methods in antenna processing: robust autocalibration and array geometry], Thesis from the Université de Paris-Sud, UFR Scientifique d'Orsay, Jun. 16, 1995.

The arrays which are most widely employed at the present time are arrays of the linear or circular type with equidistributed sensors. It is known that, in order to avoid ambiguity in this type of array, the sensors must be spaced about half a wavelength apart. This may lead to a very large number of sensors if the distance required to ensure decorrelation between at least two sensors is very large relative to the wavelength. But, on the grounds of cost and bulkiness, it is sought to limit the number of sensors. This known type of array therefore has drawbacks.

In a context other than that of radiocommunications, some authors have suggested the use of so-called sparse antenna arrays, linear arrays whose antennas are arranged in an irregular manner. However, even though the decorrelation between the sensors of such arrays is greater, for an equal number of sensors, than the decorrelation of an array with equidistributed sensors, it is generally insufficient for current propagation conditions. Moreover, arrays of the "sparse antennas" type are very sensitive to imperfections resulting from the positioning and calibration of the sensors.

The aim of the present invention is to alleviate the aforementioned drawbacks.

SUMMARY OF THE INVENTION

With this aim, the invention proposes in particular an antenna array for base station for radiocommunication with mobiles, comprising N first sensors, N being an integer greater than 2, arranged in such a way that the array exhibits substantially no ambiguity, an $(N+1)^{th}$ sensor placed or contrived in such a way as to receive signals which are decorrelated from the previous ones, and a module for processing the signals received, making it possible to locate a transmitting mobile from the signals received by the N sensors alone, and to combine these signals and the signals received by the $(N+1)^{th}$ sensor so as to improve reception by effecting spatial or spatio-temporal diversity.

In a particular embodiment of this antenna array, the mutual distance between the N first sensors is of the order of magnitude of half a transmission wavelength, and the $(N+1)^{th}$ sensor is placed at an optionally adjustable distance from each of the N first sensors, this distance being chosen in such a way that the decorrelation is ensured with a probability greater than a desired threshold. The choice of this distance depends on the choice of this threshold, as well as on the nature of the propagation of the signals, which differs depending on the propagation medium, for example depending on whether the propagation environment is of the urban or rural type.

In another particular embodiment, the N first sensors exhibit a predetermined polarization and the $(N+1)^{th}$ sensor exhibits a different polarization.

In yet another particular embodiment, the N first sensors exhibit an antenna radiation pattern having a geometry of a predetermined type and the $(N+1)^{th}$ sensor exhibits an antenna radiation pattern having a geometry of a different type.

In a particular embodiment, each of the N+1 sensors comprises two distinct circuits, one of these circuits performing the reception processing operations and the other circuit performing any transmission processing operations.

BRIEF DESCRIPTION OF THE DRAWINGS

Other characteristics and advantages of the present invention will emerge better on reading the description which follows of the particular embodiments, given by way of non-limiting examples. The description makes reference to the accompanying drawings, in which.

DETAILED DESCRIPTION OF PREFERRED EMBODIMENTS

In everything that follows, the term "sensor" is used in the sense of "antenna proper", that is to say forming part of an antenna array as defined in the introduction.

It is recalled that "antenna diversity" reception, in the field of radiocommunications, consists in using at least two sensors to receive signals from transmitters, these sensors being such that the signals that they receive are statistically decorrelated. This makes it possible in particular to reduce the probability that a given signal is in a state of fading simultaneously on all the sensors which receive it.

In the antenna array of the invention, the sensors used for receiving traffic signals from mobiles, constitute an assembly which is not identical to the assembly of sensors which is used for transmitting traffic signals to mobiles.

In reception, in accordance with a particular embodiment of the present invention, two main types of processing are performed: on the one hand, an "explicit" or "implicit" (as was described earlier) processing operation for locating mobiles, by means of N sensors $C_1, \ldots, C_N$, and on the other hand, a processing operation for demodulating the signals received, by means of N+1 sensors $C_1, \ldots, C_N, C_{N+1}$ which in general include the N sensors already used for location and which in all cases uses an additional sensor $C_{N+1}$, decorrelated from the others.

The reception demodulation processing can implement a method of the so-called "MABP" type, described in the patent document FR-A-2,716,761. This method, applied in reception, performs a spatio-temporal processing of the useful signal.

It is also possible to use a conventional so-called "blind" method for identifying the useful propagation channel, and also that of any sources of interference.

Other methods, which take into account both diversity and the rejection of sources of interference, exist and are useable.

The signals received are thus processed. This can also be done by using other techniques including, by way of non-limiting examples, a switching-based diversity technique, or a combination-based diversity technique. Useful reference may be made in this regard to the work by W. C. Y. LEE entitled "Mobile Communications Design Fundamentals", Sams 1986.

On the other hand, in transmission, in the particular embodiment already described above with respect to reception, only the N sensors $C_1, \ldots, C_N$ are used for the traffic signals.

Figure 1:
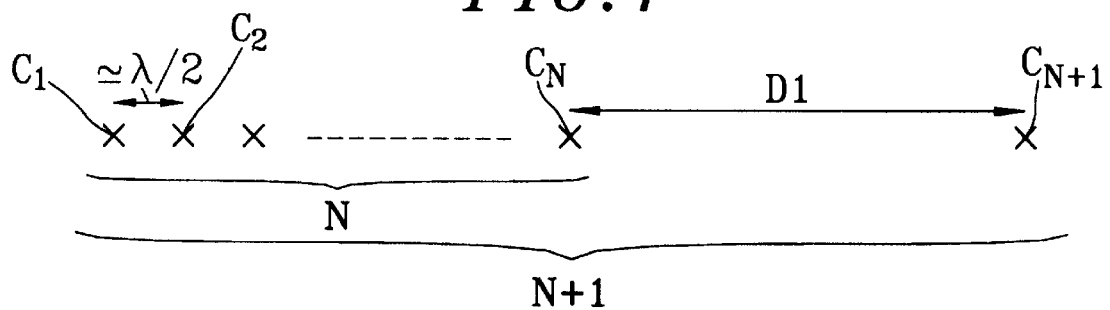
FIGS. 1 to 3 represent diagrammatically various particular embodiments of an antenna array according to the invention, these not being to scale for greater clarity.
Figure 2:
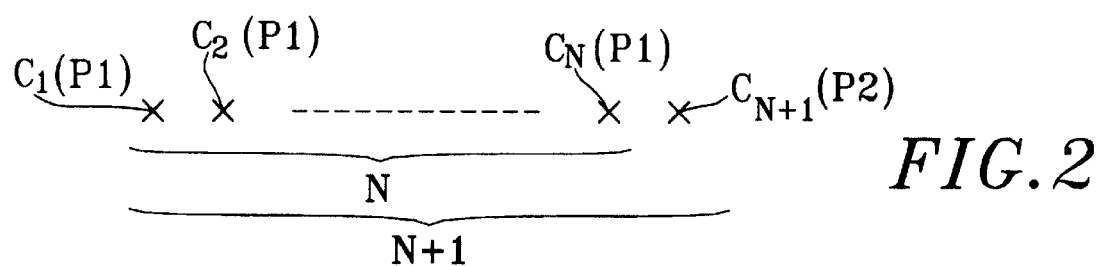
Figure 3:
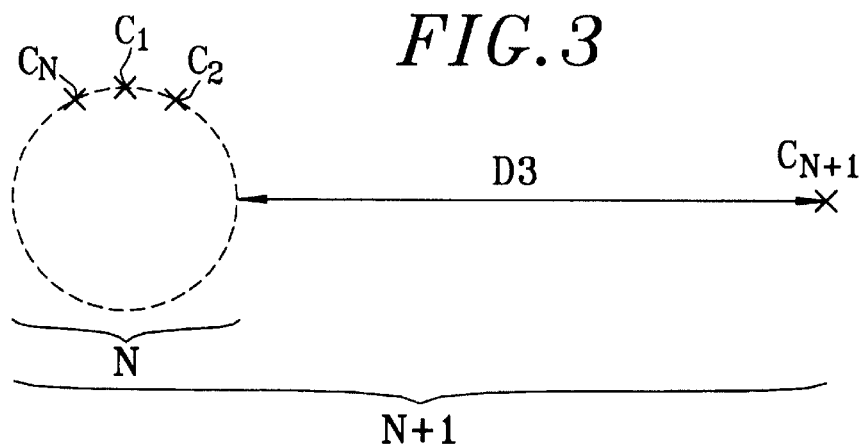

FIGS. 1 to 3 each illustrate a particular embodiment of an antenna array according to the present invention.

In FIGS. 1 to 3, the antenna array comprises N+1 sensors $C_1, C_2, \ldots, C_N, C_{N+1}$, where N is an integer greater than 2. The N first sensors $C_1, \ldots, C_N$ are arranged in such a way that there is substantially no array ambiguity.

Figure 5:
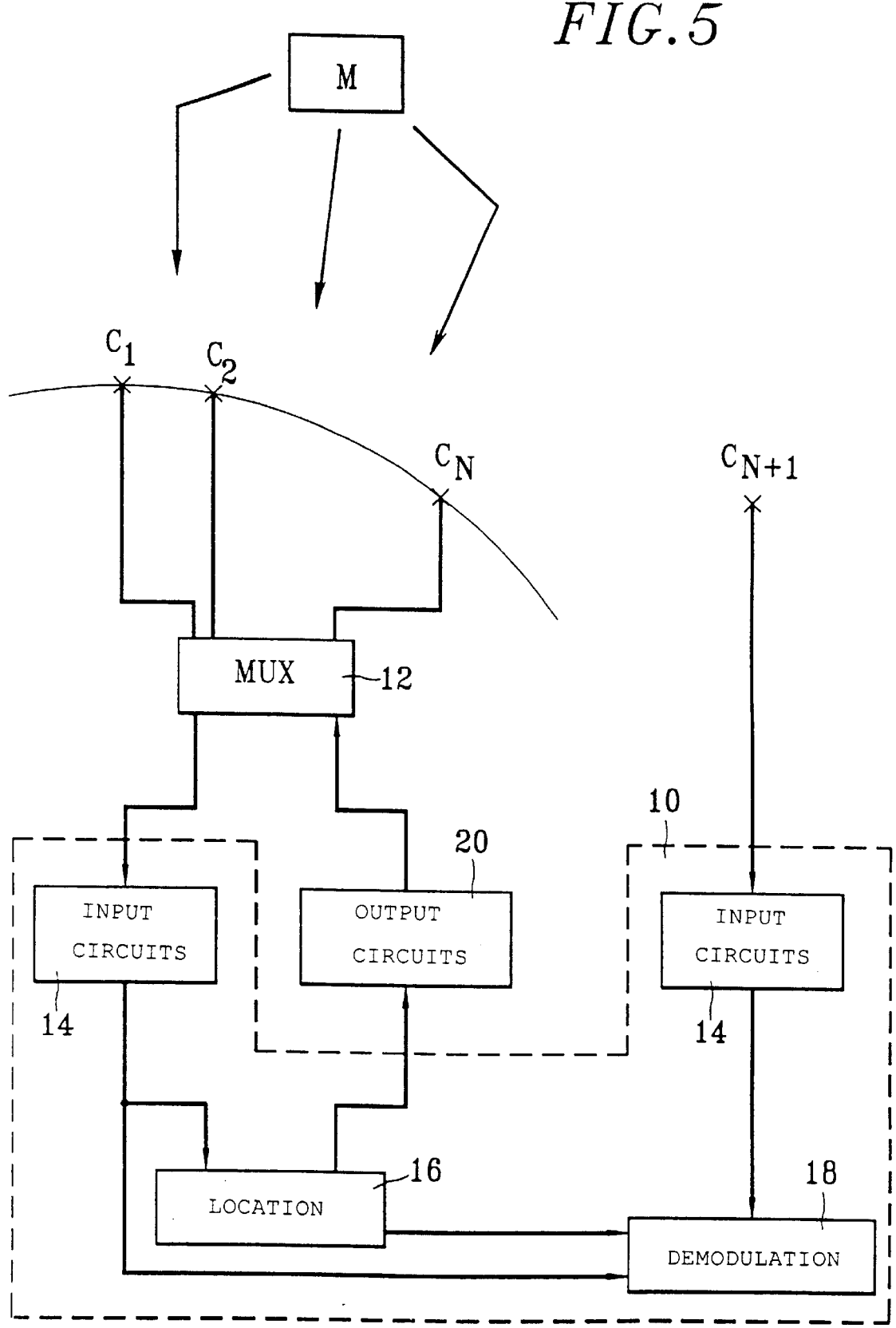
FIG. 5 represents diagrammatically a mobile, as well as an antenna array in accordance with a particular embodiment of the invention, the module for processing the signals received being represented diagrammatically.

These N sensors are used both in reception and in transmission: in reception, in conjunction with a module for processing the signals received, which is designated by the reference numeral 10 in FIG. 5, the N first sensors make it possible to locate directionally, in an explicit or implicit manner, each of several transmitting mobiles, such as the mobile M of FIG. 5, from signals received by these N sensors; in transmission, these N sensors retransmit signals focused towards useful mobiles.

The $(N+1)^{th}$ sensor $C_{N+1}$ is placed or contrived in such a way as to receive signals which are decorrelated from the previous ones. The N+1 sensors are used for the demodulation processing operations. In conjunction with the module 10 for processing the signals received, the assembly formed by the N+1 sensors makes it possible to improve reception by effecting spatial or spatio-temporal diversity, using in addition the signals received by the $(N+1)^{th}$ sensor.

A multiplexer module 12 is linked to the N first sensors. The module 10 for processing the signals received comprises in particular input circuits 14. Those of the input circuits 14 which correspond to the N first sensors are linked to the multiplexer module 12. The assembly of input circuits 14 perform appropriate conventional processing operations of conversion, into intermediate or baseband frequency, of the signals received, of optional sampling, of optional analogue/digital conversion and of amplification.

The module 10 for processing the signals received also comprises an explicit or implicit locating module 16 linked to those of the input circuits 14 which correspond to the N first sensors, and a demodulation module 18 linked to the locating module 16 and to the input circuits 14 of the N+1 sensors $C_1, \ldots, C_N, C_{N+1}$.

Output circuits 20 are linked to the output of the locating module 16 and the input of the multiplexer 12, as shown in FIG. 5. The output circuits 20 perform appropriate conventional processing operations of optional sampling, of optional digital/analogue conversion, of modulation at the carrier frequency and of amplification.

In the particular embodiment of FIG. 1, the antenna array is of the linear type, this geometry being in no way limiting. It comprises N first sensors $C_1, \ldots, C_N$ mutually spaced apart by a distance of the order of magnitude of half the transmission wavelength, denoted $\lambda/2$ in FIG. 1, $\lambda$ designating the transmission wavelength. The N first sensors are advantageously, but not necessarily, equidistributed. This antenna array also comprises an $(N+1)^{th}$ sensor $C_{N+1}$.

As indicated earlier, the distance D1 between the sensor $C_{N+1}$ and any one of the sensors $C_1, \ldots, C_N$ can be adjustable and is such that the signals received by the $(N+1)^{th}$ sensor are decorrelated from the signals received by the other sensors with a probability which exceeds a chosen threshold. The choice of D1 depends moreover on the propagation medium; for example, it differs depending on whether the propagation takes place in a substantially uncluttered region, such as a rural environment, or in a region comprising relatively numerous obstacles, such as an urban environment.

In the particular embodiment of FIG. 2, the antenna array is also of the linear type, this geometry being in no way limiting. It comprises N first sensors $C_1, \ldots, C_N$, advantageously but not necessarily equidistributed, having a polarization, denoted P1, of a given type, and an $(N+1)^{th}$ sensor $C_{N+1}$ having a polarization, denoted P2, of a different type from the previous one. By way of non-limiting example, the N first sensors can exhibit a polarization of horizontal type, and the $(N+1)^{th}$ sensor, a polarization of vertical type.

In the particular embodiment of FIG. 3, analogous to the particular embodiment of FIG. 1, the antenna array comprises N first sensors $C_1, \ldots, C_N$ equidistributed over a circle and an $(N+1)^{th}$ sensor placed a distance D3 from this circle. The distance D3 illustrated by FIG. 3 can be chosen in a manner analogous to the distance D1 mentioned earlier and illustrated by FIG. 1.

In another particular embodiment, not illustrated, the antenna array comprises N first sensors $C_1, \ldots, C_N$ whose antenna radiation pattern exhibits a geometry of a given type, that is to say with a given width and given orientation of the lobe or lobes, and an $(N+1)^{th}$ sensor $C_{N+1}$ whose antenna radiation pattern exhibits a geometry of a different type from the previous one.

In the particular embodiments described above, the $(N+1)^{th}$ sensor can also be used in transmission, not for the traffic signals, but to transmit signals of some other kind to the mobiles, such as signalling or monitoring signals.

By way of non-limiting example, in the case of a system for radiocommunication with mobiles of the GSM type, certain signalling signals are generally broadcast throughout the whole of a given cell, and/or according to a different frequency plan from that of the traffic signals. In this case, according to an advantageous particular embodiment of the present invention, the $(N+1)^{th}$ sensor broadcasts these signalling signals throughout the whole of this cell.

Figure 4:
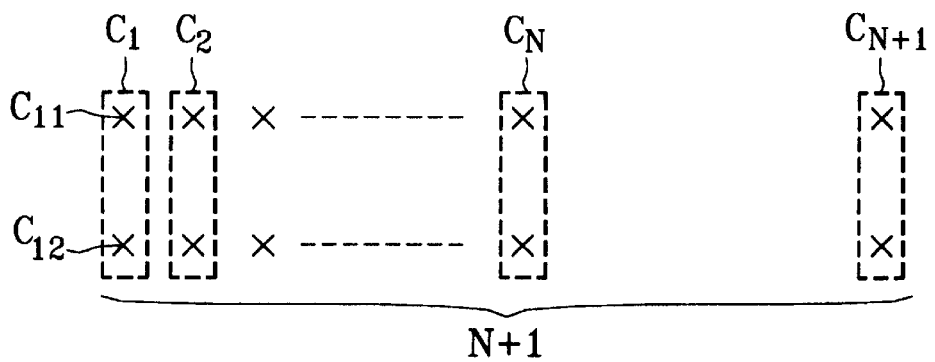
FIG. 4 represents diagrammatically a variant of an antenna array according to the invention, in which each of the sensors comprises two distinct circuits, these not being to scale for greater clarity.

Described above are particular embodiments of the present invention, in which each of the N+1 sensors of the array is used in reception and optionally in transmission. As a variant, as shown by FIG. 4, each of the N+1 sensors $C_1, C_2, \ldots, C_N, C_{N+1}$ of the array can comprise two distinct circuits which are relatively close to one another, of which one is used for the reception processing operations and the other is used for any transmission processing operations. The antenna array illustrated in FIG. 4 is of the linear type, this choice of representation being in no way limiting. In FIG. 4, the sensor $C_1$ comprises two circuits $C_{11}$ and $C_{12}$. In analogous manner, the sensors $C_2, \ldots, C_{N+1}$ likewise each comprise two distinct circuits. This construction makes it possible to avoid the use of diplexers.

I claim:

1. Antenna array for a base station for radiocommunication with mobile stations, comprising N first sensors, N being an integer greater than 2, respectively receiving N first radio signals, an $(N+1)^{th}$ sensor arranged to receive an $(N+1)^{th}$ radio signal which is decorrelated from said N first radio signals, means for locating a transmitting mobile station based on a set of received signals consisting of said N first signals, demodulation means combining said N first signals with said $(N+1)^{th}$ signal to perform diversity reception from said transmitting mobile station.

2. Antenna array according to claim 1, wherein the N first sensors are spaced by a mutual distance of the order of magnitude of half a transmission wavelength, and the $(N+1)^{th}$ sensor is so spaced from the N first sensors, that decorrelation is ensured with a probability greater than a desired threshold.

3. Antenna array according to claim 2, wherein said $(N+1)^{th}$ sensor has an adjustable location.

4. Antenna array according to claim 2, wherein said $(N+1)^{th}$ sensor is spaced from said N first sensors by a distance chosen as a function of said threshold and of a signal propagation environment.

5. Antenna array according to claim 1, wherein the N first sensors exhibit a predetermined polarization and the $(N+1)^{th}$ sensor exhibits a different polarization.

6. Antenna array according to claim 1, wherein the N first sensors exhibit an antenna radiation pattern having a geometry of a predetermined type and the $(N+1)^{th}$ sensor exhibits an antenna radiation pattern having a geometry of a different type.

7. Antenna array according to claim 1, wherein each of the (N+1) sensors is associated with a respective pair of circuits, consisting of a first circuit for performing reception processing operations and a second circuit for performing transmission processing operations.

8. Antenna array according to claim 1, wherein the first N sensors are arranged in an array having a main lobe having a first amplitude and side lobes having amplitudes substantially lower than said first amplitude.

9. Antenna array according to claim 1, wherein the diversity reception comprises spatial and/or spatio-temporal diversity reception.

* * * * *